Aug. 2, 1955      E. PFAFFENBERGER      2,714,329

EXPOSURE METER

Filed Nov. 23, 1953

Inventor:
Erwin PFAFFENBERGER

Attorney

United States Patent Office 2,714,329
Patented Aug. 2, 1955

2,714,329

EXPOSURE METER

Erwin Pfaffenberger, Erlangen, Germany, assignor to P. Gossen & Co. G. m. b. H., Erlangen, Germany, a firm Application November 23, 1953, Serial No. 393,873

Claims priority, application Germany November 24, 1952

4 Claims. (Cl. 88—23)

This invention relates to certain improvements in or relating to exposure meters.

It is an object of the invention to provide an exposure meter which is of simple construction and easy to operate.

A special object of the invention is to provide an exposure meter which facilitates the selection among those combinations of exposure time and aperture values which could be used in view of the light intensity value measured in an actual case.

Still another object of the invention is to provide an exposure meter which is adapted also for determining the proper adjustment, as regards cine speed and aperture, in case of cinematographic exposures.

A still further object of the invention is to provide means permitting easy adjustment of the exposure meter regarding the sensitivity of the film.

With these and other objects in view, this invention consists in the details of construction, combination of elements and operation hereinafter set forth and then specifically designated by the claims.

Figure 1:
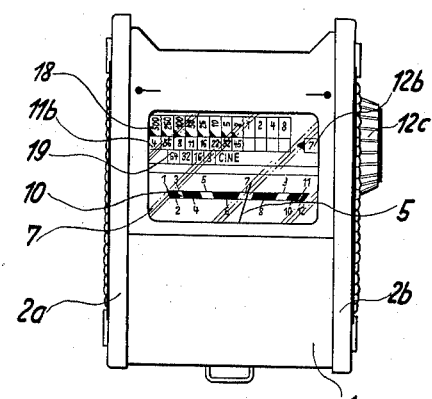
Figure 2:
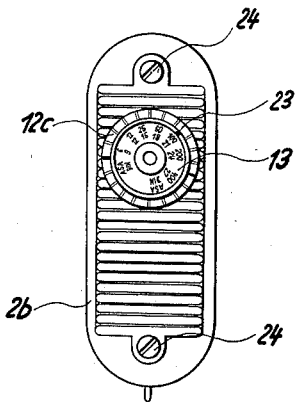
Figure 3:
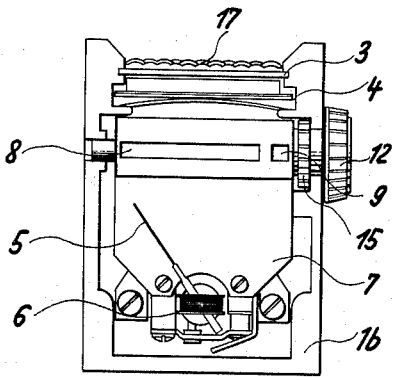
Figure 4:
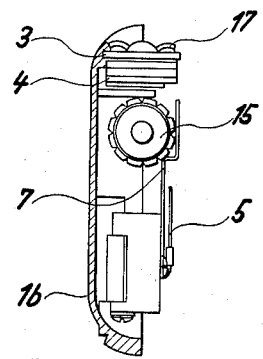
Figure 7:
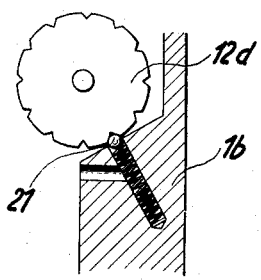
Figure 5:
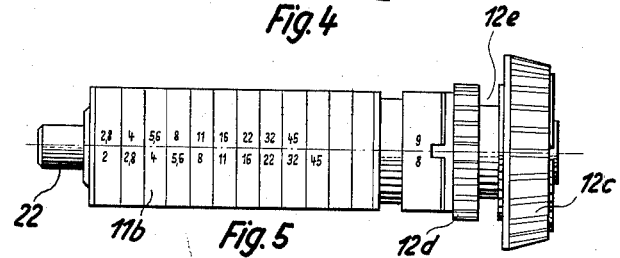
Figure 6:
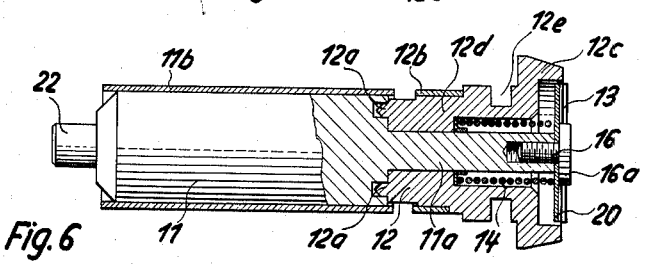

In order that those skilled in the art to which this invention appertains may understand how to make and use the same, I will describe its construction in detail, referring by numerals to the accompanying drawing forming part of this application, in which:

Fig. 1 is a front view of an exposure meter having the invention applied thereto, Fig. 2 is a side view thereof, Fig. 3 is a view similar to Fig. 1, with the outer cover of the casing removed, Fig. 4 is a side view thereof, Fig. 5 is a detail, on a larger scale, showing the revolving scale roller thereof, Fig. 6 is an axial section of Fig. 5, and Fig. 7 is a detail showing the notch and spring catch means therefor.

Similar reference numerals denote similar parts in the different views.

Referring now to the drawing in greater detail, it will be seen that the casing of the exposure meter is formed by a front side shell member 1a, Fig. 1, a rear side shell member 1b, Figs. 3 and 4, and side plates 2a and 2b secured to the shell members 1a and 1b by screws 24, Fig. 2 and holding the shell members together by their inwardly bent edges, as will be seen from Fig. 1. A moving coil galvanometer 6 is connected to a light-sensitive cell 4 (connection not shown) to which the light to be measured is admitted through a transparent plate 17 consisting of sections of honeycomb configuration defining the aperture angle. The needle 5 of the galvanometer is movable across a scale 10, Fig. 1, which is provided with numerals denoting light values, for instance, from "1 . . . 12." The scale plate 7 has a window 8 for the aperture values and a window 9 for reading the light intensity values which have been adjusted as will be hereinafter described.

Mounted below the windows 8 and 9 is a rotatable roller unit whose longer member 11 is provided with a scale 11b bearing a plurality of axial rows of numerals denoting aperture values and whose shorter member 12 is provided with a scale 12b bearing numerals denoting light intensity values.

The two roller members 11 and 12 can be rotatably displaced in relation to each other for adjusting the film sensitivity. To this end, member 11 is provided with an extension 11a of smaller diameter which is rotatable in a bore of member 12 which in turn is provided with a plurality of small projections 12a adapted to engage in corresponding recesses of roller 11, said projections and recesses being uniformly distributed all over a circular line on the adjacent end faces of the rollers 11 and 12, respectively. Furthermore, the shaft 11a is provided at its free end with a plate 20 which is secured thereon by a screw 16 having a head 16a with knurled face. Plate 20 can be pressed into a complementary recess of a fluted hand wheel or knob portion 12c of member 12 and turned in the depressed condition by said knurled face, said plate 20 being provided with ASA and/or DIN numerals 13 denoting film sensitivity. A spring 14 housed in a corresponding recess of member 12 acts to urge plate 20 towards its flush position in the recess of knob 12c, corresponding to the position of engagement of the projections 12a in the complementary recesses in member 11.

The adjacent rows of aperture values on scale 11b are relatively displaced by one step each and arranged in such a way that always one of the rows only is exposed in the slot 8 and can be read off. A further row of numerals denoting exposure values is marked on the scale plate 7 above the slot 8, at 18, while the correlated cine speeds are marked below the slot 8, at 19.

When turning the knob 12c the numerals of the light intensity values provided on scale 12b of roller 12 and corresponding to those indicated on scale 10 are exposed in the opening 9. A notched disc 12d of member 12 cooperates with a spring-urged ball 21, Fig. 7, to provide a stop motion for resiliently locking the two rollers 11 and 12 in their proper positions for reading the scales 11b and 12b. A grooved portion 12e of roller 12 serves to support the combined roller unit 11, 12 in the right hand wall 2b of the casing while a journal 22 serves to support the roller unit 11, 12 in the left hand wall 2a thereof.

The exposure meter is operated as follows:

At first, the film sensitivity is adjusted on knob 12c by pressing down the inner plate 20 and turning it so that the film speed value is below a black point 23 on wheel 12c. In the position shown in Fig. 2 the value 100 ASA has been adjusted. As the plate 20 is released, the members 11 and 12 are again positively coupled with each other, by action of spring 14 and projections 12a. Then the knob 12c is turned until the value indicated by the needle 5 on the scale 10 appears in the window 9. Now the scale in slot 8 in connection with the scale 18 give the proper pairs of apertures and exposure values, i. e. the correlated aperture and exposure values are facing each other. For instance, the light intensity value "7" may be indicated by the needle 5 and accordingly has been adjusted in window 9 as shown. In this case, provided that the film speed ASA 100 has been adjusted as explained above, a snapshot may be made, for instance, with an exposure time of 1/50 second and an aperture of 11 or with an exposure time of 1/25 second and an aperture of 16. In case of cinematographic exposures, a cine speed of 32 pictures per second may be adjusted together with an aperture of 8 or 11.

It will be appreciated that the operation of my novel exposure meter is extremely simple, foolproof, and reliable. No readjustment is required in order to find out the proper combination of exposure time and aperture values adapted in the actual case.

It will be understood that theoretically, in accordance with the invention, the aperture and exposure value scales could be interchanged in such a way that axially displaced rows of exposure values could be provided on the scale 11b while the correlated aperture values in this case would be provided at 18. However, cine speeds could not be indicated in such an arrangement, so that the modification as shown and described is the preferred form.

I claim:

1. An exposure meter comprising a casing, a light admission window in said casing, a light-sensitive cell exposed to the light admitted through said window, an electric measuring instrument controlled by said cell, a scale and pointer arrangement for indicating the light intensity values measured by said cell, a bi-partite roller mounted for rotation in said casing and comprising an outer control knob, a film sensitivity adjusting member coaxially and rotatably mounted with respect to said knob, a first roller member provided with a plurality of axial rows of aperture values, the adjacent rows on the roller member being axially displaced against each other by one step each, a second roller member provided with a plurality of light intensity values corresponding to the light intensity values indicated on the scale, said casing being provided with second and third windows for exposing in each position of the roller one row of aperture values and correlated light intensity values, respectively, means including a film sensitivity scale for rotatively displacing and reconnecting the first and second roller members in relation to each other, so as to adjust the exposure meter for different film sensitivities, and a scale comprising at least one row of exposure values provided adjacent to the second window, parallel to the exposed row of aperture values, in such a way that the proper pairs of aperture and correlated exposure values register with each other in case of adjustment, in the third window, of the light intensity value indicated by the pointer and scale arrangement.

2. An exposure meter comprising a casing, a light admission window in said casing, a light-sensitive cell exposed to the light admitted through said window, an electric measuring instrument controlled by said cell, a scale and pointer arrangement for indicating the light intensity values measured by said cell, a bipartite roller mounted for rotation in said casing and comprising an outer control knob, a film sensitivity adjusting member coaxially and rotatably mounted with respect to said knob, a first roller member provided with a plurality of axial rows of aperture values and being connected to the film sensitivity adjusting member, the adjacent rows on the roller member being axially displaced against each other by one step each, a second roller member connected to the handwheel and provided with a plurality of light intensity values corresponding to the light intensity values indicated on the scale, said casing being provided with second and third windows for exposing in each position of the roller one row of aperture values and correlated light intensity values, respectively, means including a film sensitivity scale for rotatively displacing and reconnecting the first and second roller members in relation to each other, so as to adjust the exposure meter for different film sensitivities, and a scale comprising at least one row of exposure values provided adjacent to the second window, parallel to the exposed row of aperture values, in such a way that the proper pairs of aperture and correlated exposure values register with each other in case of adjustment, in the third window, of the light intensity value indicated by the pointer and scale arrangement.

3. An exposure meter comprising a casing, a light admission window in said casing, a light-sensitive cell exposed to the light admitted through said window, an electric measuring instrument controlled by said cell, a scale and pointer arrangement for indicating the light intensity values measured by said cell, a bipartite roller mounted for rotation in said casing and comprising an outer control knob, a film sensitivity scale plate coaxially and rotatably mounted with respect to said knob, a first roller member provided with a plurality of axial rows of aperture values and formed with an extension connected to the film sensitivity scale plate, the adjacent rows being axially displaced against each other by one step each, a second roller member connected to the handwheel and provided with a plurality of light intensity values corresponding to the light intensity values indicated on the scale, said extension passing through a central bore of said second roller member and said casing being provided with second and third windows for exposing in each position of the roller one row of aperture values and associated light intensity values, respectively, means for rotatively displacing and reconnecting the first and second roller members in relation to each other, so as to adjust the exposure meter for different film sensitivities, and a scale comprising at least one row of exposure values provided adjacent to the second window, parallel to the exposed row of aperture values, in such a way that the proper pairs of aperture and correlated exposure values register with each other in case of adjustment, in the third window, of the light intensity value indicated by the pointer and scale arrangement.

4. An exposure meter comprising a casing, a light admission window in said casing, a light-sensitive cell exposed to the light admitted through said window, an electric measuring instrument controlled by said cell, a scale and pointer arrangement for indicating the light intensity values measured by said cell, a bipartite roller mounted for rotation in said casing and comprising an outer control knob, a film sensitivity scale plate coaxially and rotatably mounted with respect to said knob, a first roller member provided with a plurality of axial rows of aperture values and formed with an extension connected to the film sensitivity scale plate, the adjacent rows being axially displaced against each other by one step each, a second roller member connected to the handwheel and provided with a plurality of light intensity values corresponding to the light intensity values indicated on the scale, said extension passing through a central bore of said second roller member and said casing being provided with second and third windows for exposing in each position of the roller one row of aperture values and associated light intensity values, respectively, said scale plate being adapted to be depressed against spring action and to be rotated in relation to the control knob for rotatively displacing and reconnecting the first and second roller members in relation to each other, so as to adjust the exposure meter for different film sensitivities, and a scale comprising at least one row of exposure values provided adjacent to the second window, parallel to the exposed row of aperture values, in such a way that the proper pairs of aperture and correlated exposure values register with each other in case of adjustment, in the third window, of the light intensity value indicated by the pointer and scale arrangement.

References Cited in the file of this patent

UNITED STATES PATENTS

| 2,203,209 | Weston | June 4, 1940 |
| 2,247,763 | Meyers | July 1, 1941 |
| 2,461,930 | Simpson | Feb. 15, 1949 |

FOREIGN PATENTS

| 1,029,569 | France | Mar. 11, 1953 |

OTHER REFERENCES

Phototechnik und Wirtschaft, vol. 3, pages 99–101, March 1951.